Aug. 19, 1930.  A. H. G. FOKKER  1,773,481
AIRPLANE CONSTRUCTION
Filed July 8, 1922
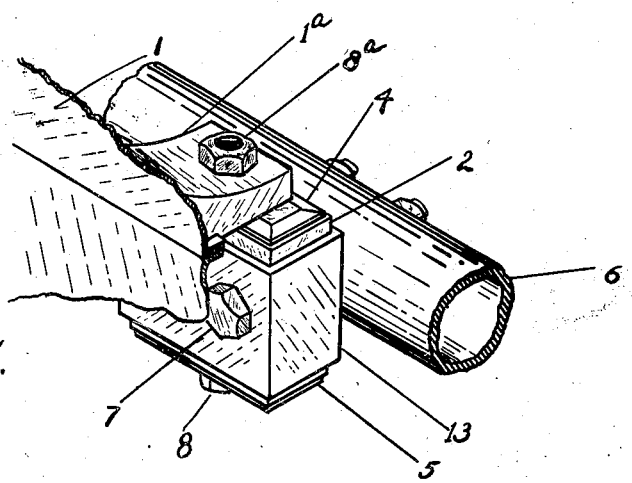
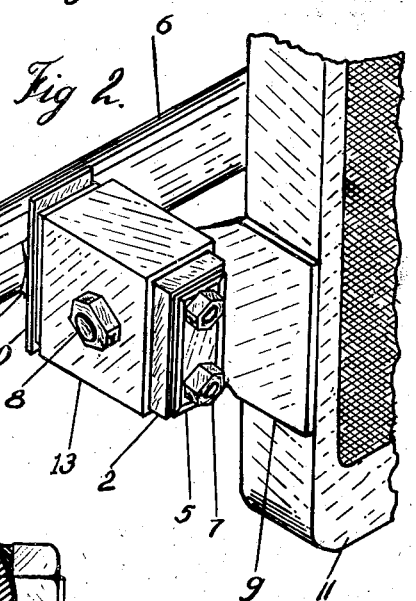
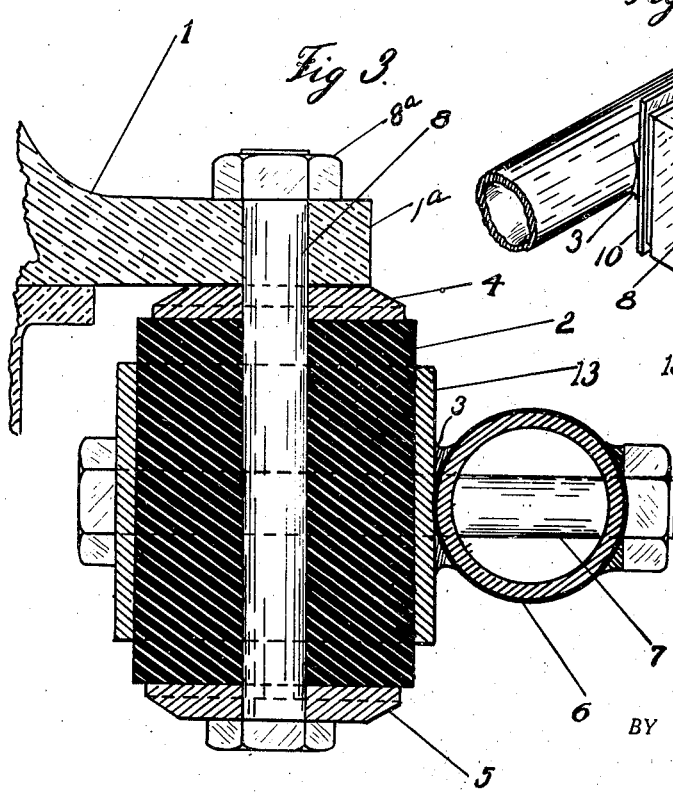
INVENTOR.
Anthony H. G. Fokker
BY
ATTORNEY.

Patented Aug. 19, 1930

1,773,481

UNITED STATES PATENT OFFICE

ANTHONY H. G. FOKKER, OF AMSTERDAM, NETHERLANDS, ASSIGNOR TO ATLANTIC AIRCRAFT CORPORATION, A CORPORATION OF NEW JERSEY

AIRPLANE CONSTRUCTION

Application filed July 8, 1922. Serial No. 573,597.

The present invention relates generally to improvements in airplane construction and is more specifically directed to the method of mounting the engine, radiator, tanks and other accessories and parts therein.

As is well known, the engine when in operation sets up vibrations which, with the present methods of mounting in aircraft construction, are directly transmitted to the supporting frame of the fuselage and thus to the radiator, tanks and other parts connected directly or indirectly thereto. The major and minor vibrations transmitted throughout the airplane structure in this manner are extremely objectionable, not only to the occupants of the plane, but in that they ultimately seriously impair the efficiency of the performance of the plane and materially decrease its period of usefulness.

The primary object of the present invention therefore it is to provide a means and method of mounting the engine, radiator, tanks and other parts and accessories in the airplane structure so as to eliminate the aforesaid objectionable vibration, or at least reduce it to an imperceptible minimum. Obviously, this will result in greater comfort to the occupants of the plane and will likewise increase the life of the various components and the airplane as a whole.

Another object of my invention is to provide simple and economical means whereby the various parts will be positively maintained in their assembled relation by the interposition of elements of connection which will function to absorb or dissipate the vibrations which may be initiated or built up in any part and thereby effectively prevent the transmission thereof to other parts, or to the airplane structure.

Other objects and advantages of my invention will become manifest as the description proceeds and I would have it understood that I reserve unto myself all rights to the full range of equivalents, both in structure and use, to which I may be entitled under my invention in its broadest aspect.

I shall now proceed to describe my invention with reference to the accompanying drawings, wherein I have illustrated certain preferred embodiments thereof as applied to the structure of a heavier-than-air type of flying machine. It is obvious, however, that my invention is also susceptible of incorporation in the structures of semi-rigid, rigid, and other types of aircraft as well as to hydroplanes and the like.

In the drawings, Fig. 1 is a view in perspective, partly in section, of a fragment of the airplane framework, showing the manner in which the engine is connected thereto.

Fig. 2 is a view similar to Fig. 1, illustrating a modified connection, such as may be employed for fixing the radiator or other part in functioning position; and Fig. 3 is a transverse section of the structure shown in Fig. 1.

Referring now to the drawings in detail, in which like characters of reference are employed to designate similar parts in the several views, and more particularly to the structure shown in Figures 1 and 3, 6 indicates one of the longitudinal frame members of the engine bed to which under present practice the engine or motor 1 is directly bolted or otherwise rigidly secured. In the present invention, however, the engine or motor 1 is indirectly supported by said frame member by means of a yieldable connection which is capable of absorbing vibrations in all directions and at the same time positively maintains the connected parts in their proper relation, irrespective of the counter stresses or thrusts to which they may be subjected in operation and use.

In the present embodiment of my invention the aforesaid yieldable connection includes a bracket 3, welded or otherwise rigidly fixed to the frame member 6, which embodies a retainer 13 formed for the reception of a preferably rectangular block of elastic material, such as rubber, as shown at 2. This block 2 is transversely bored to receive the bolts 7, preferably two in number, which pass through the parallel sides of the retainer 13 and through the frame member 6 as clearly shown in Fig. 3.

Located intermediately of the bores for the bolts 7 in the block 2, and preferably at an angle of ninety degrees thereto, I provide a bore for the reception of the engine bolt 8. A washer or plate 5 is interposed between the head of this bolt and the lower end of the block 2 while a similar washer or plate 4 is disposed between the engine lug 1 and the upper end of said block. It will be observed from the construction described, that, as the nut on the engine bolt 8 is turned down or tightened, the elastic block will be compressed between the washers or plates 4 and 5 and the four sides of the retainer 13, effectively anchoring the block within the retainer and limiting bodily movement thereof. Deformation of the block of elastic material under load or pressure is also prevented by the walls of the retainer 13 while the plates or washers 4 and 5, which are of rigid material, such as metal, and of a configuration conforming to the outline of the abutting ends of the block serve to effect the distribution of the pressure of the counter forces over the entire block.

In the structure shown in Fig. 2, the radiator 11 is supported from the transverse frame member 6 through the medium of the elastic block 2 held within the retainer 13 to which the radiator arm or bracket 9 is fixed by means of the bolt 8 passing through the parallel walls of the retainer and the elastic block 2. The bracket 3, as in the structure shown in Figures 1 and 3, is welded or otherwise immovably fastened to the frame member 6 and embodies a plate or shelf 10 which may be integral therewith, and apertured to receive the bolts 7, which pass through the elastic block 2 and extend through the openings in the plate 5. The block 2, as in the embodiment shown in Figures 1 and 3, carries the entire load of the supported element and is movable in every direction to absorb vibrations communicated to it.

It will be seen from the foregoing description of my invention that I have provided a mounting in which the absorption of vibrations is accomplished in a simple and efficient manner, without impairing the strength of the structural units or the structure as a whole.

While I have described my invention with reference to the specific showing, it is evident that various changes in details of structure may be made without departing from the spirit and scope of my invention. For example, the block 2 may be built up of laminations instead of being a solid mass and in lieu of rubber, felt or other elastic or resilient material may be used. The location of the attaching bolts may be changed and the block retainer may be of an annular, elliptical or other elongated configuration.

I claim:

1. In automotive construction, in combination, a supporting framework for a motor, radiator or the like, a mass of yieldable material such as rubber, a bracket fastened to the framework and enclosing the yieldable material, bolts fastened to the framework and passing through the yieldable material, and a fastening bolt for the motor, radiator, or the like, said bolt also passing through the yieldable material.

2. In automotive construction, in combination, a supporting framework for a motor, radiator or the like, a mass of yieldable material such as rubber, a bracket fastened to the framework and enclosing the yieldable material, bolts fastened to the framework and passing through the yieldable material, a fastening bolt for the motor, radiator, or the like, said bolt also passing through the yieldable material, and compression members about the motor fastening bolt and adapted to be clamped against the yieldable material.

3. In automotive construction, in combination, a supporting framework for a motor, radiator or the like, a mass of yieldable material such as rubber, a bracket fastened to the framework and enclosing the yieldable material, bolts fastened to the framework and passing through the yieldable material, a fastening bolt for the motor, radiator or the like, said bolt also passing through the yieldable material in a direction transverse of the first-mentioned bolts, and compression washers about the motor fastening bolts and adapted to be clamped against the yieldable material, the washers being smaller than the enclosing bracket.

4. In automotive construction, in combination, a supporting framework for a motor, radiator or the like, a mass of yieldable material such as rubber, a bracket fastened to the framework and enclosing the yieldable material, said yieldable material having ends extending beyond the bracket, bolts fastened to the framework and passing through the yieldable material, and a fastening bolt for the motor, radiator, or the like, said bolt also passing through the yieldable material.

5. In automotive construction, in combination, a supporting framework for a motor, radiator or the like, a mass of yieldable material such as rubber, a bracket fastened to the framework and enclosing the yieldable material, bolts fastened to the framework and passing through the yieldable material and bracket to fasten the yieldable material inside the bracket, and a fastening bolt for the motor, radiator, or the like, said bolt also passing through the yieldable material in a direction transverse of the first-mentioned bolts.

6. In automotive construction, in combination, a supporting framework for a motor, radiator or the like, a mass of yieldable material such as rubber, a bracket fastened to the framework and enclosing the yieldable material, said yieldable material having ends extending beyond the bracket, bolts fastened to the framework and passing through the yieldable material and bracket to fasten the yieldable material inside the bracket, and a fastening bolt for the motor, radiator, or the like, said bolt also passing through the yieldable material.

7. In automotive construction, in combination, a supporting framework for a motor, radiator or the like, a mass of yieldable material such as rubber, a bracket fastened to the framework and enclosing the yieldable material, said yieldable material having ends extending beyond the bracket, bolts fastened to the framework and passing through the yieldable material, a fastening bolt for the motor, radiator, or the like, said bolt also passing through the yieldable material in a direction transverse of the first-mentioned bolts, and compression members about the motor fastening bolt and adpted to be clamped against the ends of the yieldable material.

ANTHONY H. G. FOKKER.